United States Patent
Otsuka et al.

(10) Patent No.: US 9,316,359 B2
(45) Date of Patent: Apr. 19, 2016

(54) TANK AND MANUFACTURING METHOD THEREOF

(75) Inventors: Riki Otsuka, Toyota (JP); Hirokazu Otsubo, Toyota (JP); Motohiro Mizuno, I, Toyota (JP); Takenori Aiyama, Toyota (JP); Satoshi Ohnuma, Toyota (JP); Nobuyuki Ogami, Anjo (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 124 days.

(21) Appl. No.: 13/263,158

(22) PCT Filed: Apr. 10, 2009

(86) PCT No.: PCT/JP2009/057354
§ 371 (c)(1),
(2), (4) Date: Oct. 6, 2011

(87) PCT Pub. No.: WO2010/116527
PCT Pub. Date: Oct. 14, 2010

(65) Prior Publication Data
US 2012/0024745 A1  Feb. 2, 2012

(51) Int. Cl.
*F17C 1/06* (2006.01)
*B65D 1/40* (2006.01)
(Continued)

(52) U.S. Cl.
CPC ............... *F17C 13/06* (2013.01); *B29C 53/602* (2013.01); *B29C 63/24* (2013.01); *B29C 53/66* (2013.01); *B29C 70/32* (2013.01);
(Continued)

(58) Field of Classification Search
CPC .................. F17C 2203/0665; F17C 2203/067; F17C 2209/2154
USPC ............... 220/588, 589, 590, 591, 592, 62.19
See application file for complete search history.

(56) References Cited

U.S. PATENT DOCUMENTS 3,696,812 A * 10/1972 Jaycox ............................. 604/18
3,969,812 A *  7/1976 Beck .............................. 29/421.1
(Continued)

FOREIGN PATENT DOCUMENTS

CN       1563781 A    1/2005
CN       1720411 A    1/2006
(Continued)

OTHER PUBLICATIONS

Extended EP Search Report of EP 09 84 3036.6 mailed Sep. 27, 2012.
(Continued)

*Primary Examiner* — Shawn M Braden
(74) *Attorney, Agent, or Firm* — Kenyon & Kenyon LLP

(57) ABSTRACT

There are disclosed a tank having a structure which achieves both a burst strength and a fatigue strength, and a manufacturing method of the tank. In order to realize this, in a tank comprising a liner, and an FRP layer including a hoop layer and a helical layer formed by winding fibers around the outer periphery of the liner, at least an innermost helical layer is formed as a smooth helical layer. When the smooth helical layer, i.e., a helical layer which does not have any unevenness or which has only little unevenness is formed, the unevenness can be prevented from being transferred to the hoop layer adjacent to the helical layer. When structural bends (undulations) of the fibers of the hoop layer are suppressed, a fatigue strength of the fibers themselves can be enhanced.

7 Claims, 9 Drawing Sheets

(51) Int. Cl.
    *F17C 13/06*   (2006.01)
    *B29C 53/60*   (2006.01)
    *B29C 63/24*   (2006.01)
    *B29C 53/66*   (2006.01)
    *B29C 70/32*   (2006.01)

(52) U.S. Cl.
    CPC ............... *F17C 2201/0109* (2013.01); *F17C 2203/0604* (2013.01); *F17C 2203/067* (2013.01); *F17C 2203/0619* (2013.01); *F17C 2203/0646* (2013.01); *F17C 2203/0648* (2013.01); *F17C 2203/0665* (2013.01); *F17C 2205/0305* (2013.01); *F17C 2205/0397* (2013.01); *F17C 2209/2154* (2013.01); *F17C 2209/2163* (2013.01); *F17C 2221/012* (2013.01); *F17C 2223/0123* (2013.01); *F17C 2223/035* (2013.01); *F17C 2260/011* (2013.01); *F17C 2260/042* (2013.01); *F17C 2270/0184* (2013.01); *F17C 2270/0763* (2013.01); *Y02E 60/321* (2013.01)

(56) References Cited

U.S. PATENT DOCUMENTS

| | | | |
|---|---|---|---|
| 4,671,831 | A | 6/1987 | Mohan |
| 5,385,262 | A * | 1/1995 | Coquet et al. ............... 220/589 |
| 5,758,796 | A * | 6/1998 | Nishimura et al. ............ 220/590 |
| 7,641,949 | B2 * | 1/2010 | DeLay et al. ................. 428/35.5 |
| 8,074,826 | B2 * | 12/2011 | Cronin et al. ................. 220/589 |
| 8,096,441 | B2 * | 1/2012 | Sato et al. ..................... 220/582 |
| 2009/0071965 | A1 | 3/2009 | Iida et al. |

FOREIGN PATENT DOCUMENTS

| | | |
|---|---|---|
| DE | 24 21 619 A1 | 11/1975 |
| EP | 1958758 A1 | 8/2008 |
| JP | 40-002595 B1 | 2/1965 |
| JP | 40-006063 B1 | 3/1965 |
| JP | 08-131588 A | 5/1996 |
| JP | 11-019257 A | 1/1999 |
| JP | 2006-062355 A | 3/2006 |
| JP | 2008-032088 A | 2/2008 |
| JP | 2008-143029 A | 6/2008 |
| WO | 2008/072046 A1 | 6/2008 |

OTHER PUBLICATIONS

International Search Report issued Jul. 28, 2009 of PCT/JP2009/057354.

* cited by examiner

TANK AND MANUFACTURING METHOD THEREOF

TECHNICAL FIELD

The present invention relates to a tank and a manufacturing method thereof, and more particularly, it relates to the improvement of a structure in a tank filled with a hydrogen gas or the like with a high pressure.

BACKGROUND ART

As a tank which is utilized for the storage of hydrogen or the like, there is utilized a tank including an FRP layer formed by alternately laminating hoop layers and helical layers on the outer periphery of a liner (see e.g. Patent Document 1). The hoop layer is a layer formed by hoop-winding fibers (e.g. carbon fibers) (a winding way of winding the fibers around a tank trunk part almost vertically to a tank axis), and the helical layer is a layer formed by helically winding fibers such as carbon fibers (CF) (a winding way of winding the fibers up to a tank dome part almost in parallel with the tank axis) (see FIG. 2 of the present application). Moreover, there is also disclosed a tank which is an FRP housing formed by helically winding the fibers around the outer periphery of a mandrel and in which a phase of a reinforcing fiber bunch of each helical layer in a cylindrical member peripheral direction is shifted.

PRIOR ART DOCUMENT

Patent Documents

[Patent Document 1] JP 2008-032088 A

SUMMARY OF THE INVENTION

Problems to be Solved by the Invention

However, in a conventional technology described above, both a burst strength and a fatigue strength are not achieved sometimes.

Therefore, an object of the present invention is to provide a tank having a structure which achieves both a burst strength and a fatigue strength, and a manufacturing method of the tank.

Means for Solving the Problems

To solve such problems, the present inventors have performed various investigations. First, concerning a fiber volume content ratio (Vf) of the tank, when an inner layer has a low Vf, a fatigue strength can be enhanced. In this case, however, a burst strength lowers sometimes. That is, the higher the fiber volume content ratio (Vf) is, the higher a rupture strength becomes. In a conventional tank, however, the inner layer has a low Vf to enhance the fatigue strength, whereby a high burst strength is not obtained sometimes.

Moreover, concerning the fatigue strength, it has been found that when structural bends of fibers of the above hoop layer are large, the fatigue strength lowers. That is, when the hoop layers and helical layers are laminated to form an FRP layer and unevenness is generated in the helical layer itself disposed adjacent to the hoop layer, the unevenness is transferred to the adjacent hoop layer, whereby the hoop layer fibers themselves little meander to generate undulations, and the bends (the undulations) due to the structure are generated in the hoop layer.

Under such situations, the present inventors have performed investigations on how to decrease the structural bends (undulations) which might be generated in the fibers of the hoop layer, and have obtained a new finding which results in the solution of such a problem. On the basis of such finding, the present invention provides a tank comprising a liner, and an FRP layer including a hoop layer and a helical layer formed by winding fibers around the outer periphery of the liner, wherein at least an innermost helical layer is a smooth helical layer.

As means for decreasing the bends (the undulations) of the fibers of the hoop layers due to the structure, it is considered that the unevenness of the adjacent helical layer is decreased to prevent the unevenness from being transferred. However, as described above, in the helical layer, the fibers are wound almost in parallel with the tank axis so that the fibers are folded back in a tank dome part (see FIG. 2), such winding as to eliminate gaps among the adjacent fibers is not especially considered, and it is fundamentally difficult to decrease the bends. Usually in the helical layer, the overlap of the fibers with one another, the arrangement of the fibers or the like is not taken into consideration, and the fibers are wound in a so-called disorder manner. Heretofore, it has been suggested that, for example, a phase of a reinforcing fiber bunch of each helical layer in a cylindrical member peripheral direction is shifted, but there has not any suggestion or aiming that a helical layer which does not have any unevenness or has only little unevenness is formed in a tank having a dome part.

In this respect, according to the present invention, at least the innermost helical layer, that is, the helical layer which does not have any unevenness or has only little unevenness, and hence the unevenness can be prevented from being transferred to the hoop layer adjacent to the helical layer. In this case, as in a conventional technology, it is possible to decrease structural fiber bends due to the surface of an uneven helical layer (indicating the helical layer which is not subjected to any treatment for smoothening the surface thereof and has the unevenness occurring on the surface, as denoted with mark 70B in FIG. 11 and FIG. 12). When the structural bends (undulations) of the fibers of the hoop layer adjacent to the uneven helical layer are suppressed, the fatigue strength of the fibers themselves can be enhanced.

Additionally, in the fiber layers (the helical layer and the hoop layer), the layer positioned on an inner side (the layer close to the liner) has a larger degree of contribution of the tank strength. According to the present invention in which at least the innermost helical layer is the smooth helical layer, the hoop layer adjacent to the smooth helical layer (e.g. the hoop layer wound outside the smooth helical layer) can smoothly be wound, which can noticeably contribute to the enhancement of the tank strength.

Moreover, in the tank according to the present invention, a layer adjacent to the hoop layer is preferably another hoop layer or the smooth helical layer. In this case, the surface of the layer adjacent to the hoop layer can be a smooth surface, and hence structural bends of the fibers are not generated or can be decreased.

Furthermore, in the tank according to the present invention, a layer adjacent to an uneven helical layer is preferably a smooth helical layer. When the layer adjacent to the uneven helical layer is the smooth helical layer, the unevenness of the surface of the uneven helical layer is absorbed by the smooth helical layer, and the hoop layer can be prevented from being influenced by the unevenness.

Additionally, in the tank according to the present invention, the smooth helical layer is preferably formed by setting N points arranged in a peripheral direction as reference positions, winding the fibers around the outer periphery of the liner so that the fibers successively pass the reference positions, and then successively winding the fibers around positions shifted in the peripheral direction so that the fibers are disposed adjacent to the previously wound fibers. In this case, by a wound resin, a pattern in which substantially triangular unit patterns are regularly combined is formed on the surface of the smooth helical layer, and portions which become boundaries among the adjacent unit patterns are preferably formed in 2N portions in the peripheral direction of the tank. Furthermore, a pattern formed in a dome part of the tank by the wound fibers is preferably an N-gon shape. N is further preferably any of integers which are from 1 to 5.

Moreover, a manufacturing method according to the present invention is a manufacturing method of a tank including a liner, and an FRP layer constituted of a hoop layer and a helical layer formed by winding fibers around the outer periphery of the liner, comprising the steps of: setting N points arranged in a peripheral direction of the liner as reference positions; winding the fibers around the outer periphery of the liner so that the fibers successively pass the reference positions; and then successively winding the fibers around positions shifted in the peripheral direction so that the fibers are disposed adjacent to the previously wound fibers, to form at least an innermost helical layer as a smooth helical layer.

Furthermore, a cylindrical member according to the present invention is a cylindrical member comprising an FRP layer including a hoop layer and a helical layer formed by winding fibers, wherein at least an innermost helical layer is a smooth helical layer.

Effect of the Invention

According to the present invention, it is possible to realize a tank having a structure which achieves both a burst strength and a fatigue strength. Moreover, it is possible to realize a cylindrical member in which the fatigue strength is enhanced.

DETAILED DESCRIPTION OF THE INVENTION

Figure 1:
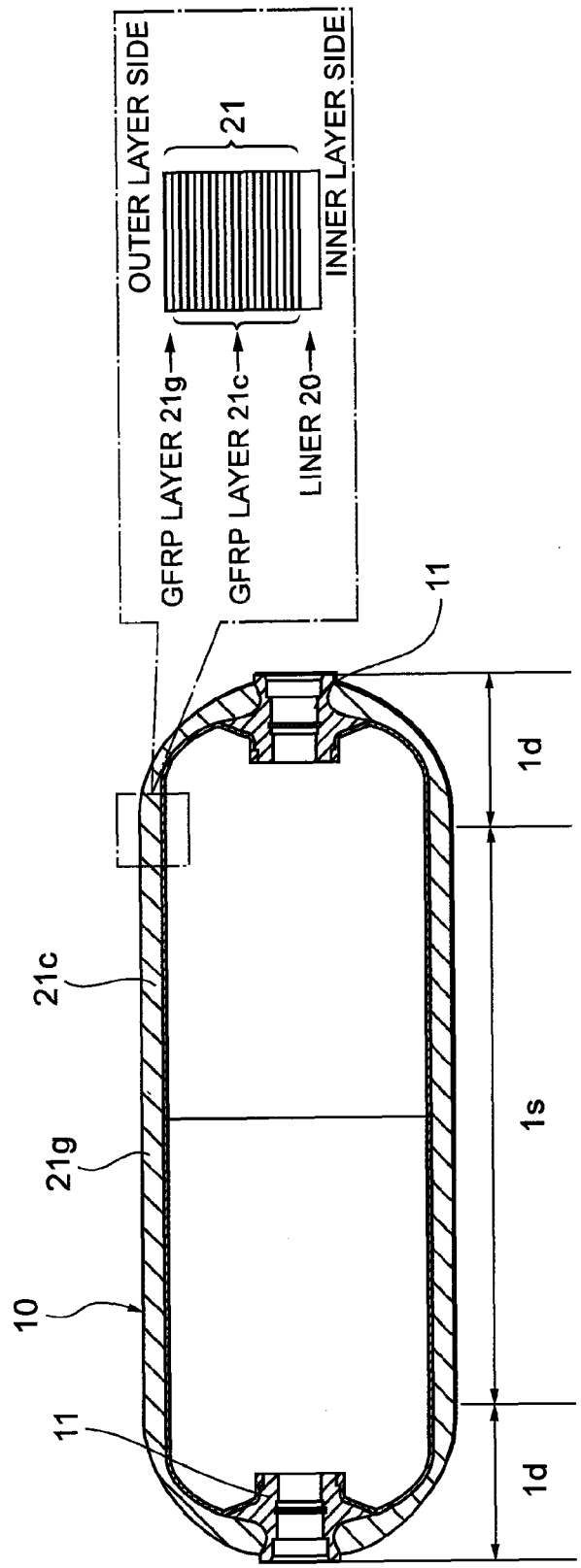
FIG. 1 shows a sectional view and a partially enlarged view showing a structure of a tank (the high-pressure tank) in an embodiment of the present invention.

Hereinafter, a constitution of the present invention will be described in detail with respect to an example of a mode for carrying out the invention shown in drawings.

FIG. 1 to FIG. 10 show an embodiment of a tank according to the present invention and a manufacturing method of the tank. Hereinafter, there will be described illustration of a case where a tank (hereinafter also referred to as the high-pressure tank) 1 according to the present invention is applied to a high-pressure hydrogen tank as a hydrogen fuel supply source. The hydrogen tank can be utilized in a fuel cell system or the like.

The high-pressure tank 1 includes a cylindrical tank main body 10 having both ends, for example, with a schematically semispherical shape, and a mouthpiece 11 attached to an end of the tank main body 10 in a longitudinal direction. It is to be noted that in the present description, a substantially semispherical part is referred to as a dome part, a cylindrical trunk part is referred to as a straight part, and the parts are denoted with marks 1*d* and 1*s*, respectively (see FIG. 1, FIG. 2, etc.). Moreover, the high-pressure tank 1 according to the present embodiment has the mouthpieces 11 at both ends, but for the convenience of the description, the tank is described with reference to FIG. 3 showing a main section of the high-pressure tank 1 in which a positive direction of an X-axis (a direction shown by an arrow) is a tip side and a negative direction thereof is a base side. A positive direction (a direction shown by an arrow) of a Y-axis which is vertical to the X-axis indicates a tank outer peripheral side.

The tank main body 10 includes a wall layer having, for example, a two-layer structure, and includes a liner 20 as an inner wall layer and, for example, an FRP layer 21 as a resin fiber layer (a reinforcing layer) which is an outer wall layer outside the liner. The FRP layer 21 is formed by, for example, an only CFRP layer 21*c*, or the CFRP layer 21*c* and a GFRP layer 21*g* (see FIG. 1).

The liner 20 is formed into almost the same shape as the tank main body 10. The liner 20 is made of, for example, a polyethylene resin, a polypropylene resin, another hard resin or the like. Alternatively, the liner 20 may be a metal liner made of aluminum or the like.

On the tip side of the liner 20 provided with the mouthpiece 11, an inwardly bent folded part 30 is formed. The folded part 30 is folded back toward the inside of the tank main body 10 so that the folded part is disposed away from the outside FRP layer 21. The folded part 30 has a tapered portion 30*a* having a diameter which gradually decreases closer to a folding tip, and a cylindrical portion 30*b* connected to the tip of the tapered portion 30*a* and having a constant diameter. The cylindrical portion 30*b* forms an opening of the liner 20.

The mouthpiece 11 has a schematically cylindrical shape, and is fitted into the opening of the liner 20. The mouthpiece 11 is made of, for example, aluminum or an aluminum alloy, and manufactured into a predetermined shape by, for example, a die cast process or the like. The mouthpiece 11 is fitted into a divided liner formed by injection. Moreover, the mouthpiece 11 may be attached to the liner 20 by, for example, insert forming.

Moreover, in the mouthpiece 11, for example, a valve fastening flange 11a is formed on the tip side (outside the high-pressure tank 1 in the axial direction), and an annular recess portion 11b is formed behind the valve fastening flange 11a (inside the high-pressure tank 1 in the axial direction) with respect to the axis of the high-pressure tank 1. The recess portion 11b is curved to project on an axis side and has an R-shape. The recess portion 11b comes in contact with the vicinity of the tip of the FRP layer 21 having the same R-shape in an airtight manner.

For example, the surface of the recess portion 11b which comes in contact with the FRP layer 21 is provided with solid lubrication coating C such as a fluoric resin. This decreases a friction coefficient between the FRP layer 21 and the recess portion 11b.

Further behind the recess portion 11b of the mouthpiece 11, a collar portion 11c is formed to conform to, for example, the shape of the folded part 30 of the liner 20, and has, for example, a large diameter continuously with the recess portion 11b, and a mouthpiece cylindrical portion 11d having a predetermined diameter is formed behind the collar portion 11c. The tapered portion 30a of the folded part 30 of the liner 20 comes in contact closely with the surface of the collar portion 11c, and the cylindrical portion 30b comes in contact closely with the surface of the mouthpiece cylindrical portion 11d. Between the cylindrical portion 30b and the mouthpiece cylindrical portion 11d, seal members 40 and 41 are interposed.

A valve assembly 50 controls supply/discharge of a fuel gas between an external gas supply line (a supply path 22) and the inside of the high-pressure tank 1. Seal members 60 and 61 are interposed between the outer peripheral surface of the valve assembly 50 and the inner peripheral surface of the mouthpiece 11.

The FRP layer 21 is formed, for example, by winding fibers (reinforcing fibers) 70 impregnated with a resin around the outer peripheral surface of the liner 20 and the recess portion 11b of the mouthpiece 11 through filament winding forming (FW forming) and hardening the resin. As the resin of the FRP layer 21, for example, an epoxy resin, a modified epoxy resin, an unsaturated polyester resin or the like is used. Moreover, as the fibers 70, carbon fibers (CF), metals fiber or the like are used. During the FW forming, while rotating the liner 20 around a tank axis, a guide of the fibers 70 is moved along the tank axial direction, whereby the fibers 70 can be wound around the outer peripheral surface of the liner 20. It is to be noted that in actual, a fiber bunch obtained by bundling a plurality of fibers 70 is usually wound around the liner 20, but in the present description, the fibers including the case of the fiber bunch are simply referred to as the fibers.

Next, there will be described a fiber winding pattern for decreasing structural bends of the fibers (e.g. carbon fibers CF) 70 in the tank 1 (see FIG. 2, etc.).

As described above, the tank 1 is formed by winding the fibers (e.g. the carbon fibers) 70 around the outer periphery of the liner 20 and hardening the resin. Here, the winding of the fibers 70 includes hoop winding and helical winding, a hoop layer (denoted with mark 70P in FIG. 4) is formed by hoop-wound layers of the resin, and a helical layer (denoted with marks 70H in FIG. 9 and FIG. 10) is formed by helically wound layers, respectively. In the former hoop winding, the fibers 70 are wound around the straight part (the tank trunk part) of the tank 1 in the form of a coil spring to tightly wind the corresponding part, and a force for countering a force directed in an Y-axis positive direction (a force to expand to the outside in a diametric direction) is exerted on the liner 20 by a gas pressure. On the other hand, the latter helical winding is a winding way for a main purpose of tightly winding the dome part in a tight winding direction (inwardly in the tank axial direction), and the fibers 70 are wound around the whole tank 1 so that the fibers are caught by the dome part, thereby mainly contributing to the enhancement of a strength of the dome part. It is to be noted that an angle (an acute angle) formed by a helix (a screw thread line in a screw) of the fibers 70 wound in the form of the coil spring and the center line (a tank axis 12) of the tank 1 is "the winding angle with respect to the tank axis (12)" of the fibers 70 mentioned in the present description and denoted with mark a in FIG. 2 (see FIG. 2).

Figure 2:
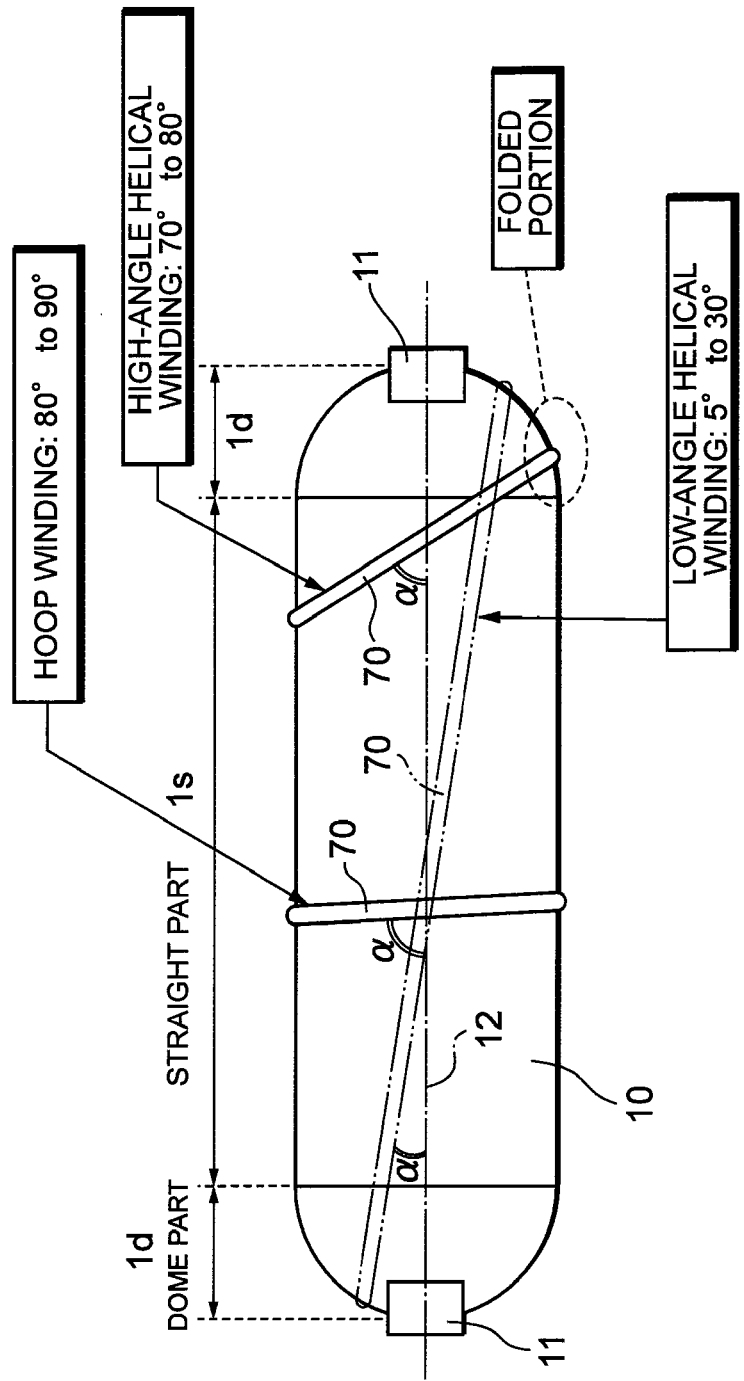
FIG. 2 is a sectional view of the structure of the tank (the high-pressure tank) in the embodiment of the present invention.
Figure 3:
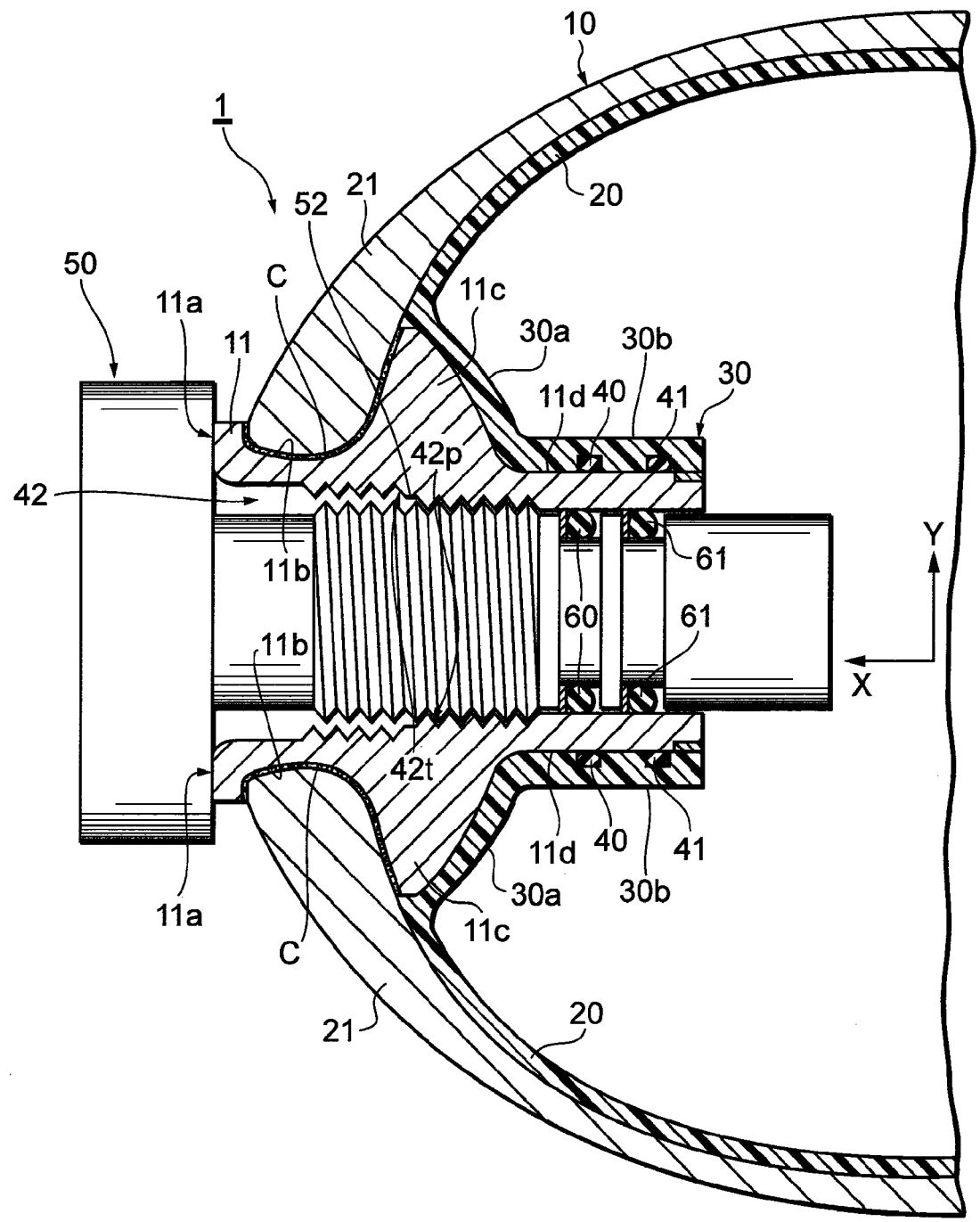
FIG. 3 is a sectional view showing a structure example around a mouthpiece of the tank.

Among these various winding ways, in the hoop winding, the fibers 70 are wound around the straight part almost vertically to the tank axis, and in this case, a specific winding angle is, for example, from 80 to 90° (see FIG. 2). The helical winding (or impress winding) is a winding way of also winding the fibers 70 around the dome part, and the winding angle with respect to the tank axis is smaller than in the hoop winding (see FIG. 2). The helical winding is roughly divided into two types of high-angle helical winding and low-angle helical winding, and in the high-angle helical winding of the two types, the winding angle with respect to the tank axis is comparatively large, and a specific example of the winding angle is from 70 to 80°. On the other hand, in the low-angle helical winding, the winding angle with respect to the tank axis is comparatively small, and a specific example of the winding angle is from 5 to 30°. It is to be noted that in the present description, helical winding with a winding angle of 30 to 70° which is an angle between the above angles is referred to as medium-angle helical winding sometimes. Furthermore, helical layers formed by the high-angle helical winding, the medium-angle helical winding and the low-angle helical winding are referred to as a high-angle helical layer, a medium-angle helical layer (denoted with mark 70MH) and a low-angle helical layer (denoted with mark 70LH), respectively. Moreover, a folded portion of the dome part 1d of the high-angle helical winding in the tank axial direction is referred to as a folded portion (see FIG. 2).

Usually in the hoop winding itself, the fibers 70 are spirally wound while the fibers are disposed adjacent to each other, and in the winding way, the fibers can be wound so that the fibers 70 are prevented from being overlapped, to prevent unevenness from being generated. On the other hand, the helical winding is usually performed for the main purpose of tightly winding the dome part, and in the winding way, it is difficult to decrease the overlap of the fibers 70 with one another and the unevenness, or the decreasing of these defects is not sufficiently taken into consideration. The hoop winding and the helical winding are appropriately combined in accordance with specifications such as an axial length, a diameter and the like of the tank 1, and the hoop layer 70P and the helical layer 70H are laminated around the liner 20 (see FIG. 1, etc.). At this time, when the helical layer 70H is disposed adjacent to the hoop layer 70P, the unevenness of the helical layer 70H is transferred to the hoop layer 70P, and bends (undulations) are generated in the fibers 70 of the hoop layer 70P sometimes.

In this respect, according to the present embodiment, at least the innermost helical layer 70H is formed as a smooth helical layer, and the unevenness which might be generated in the hoop layer 70P adjacent to this helical layer is decreased. As described later, the smooth helical layer 70H is a layer formed by the helical winding so that the overlap of the fibers 70 with each other is decreased. In the smooth helical layer 70H, the next fiber 70 is in principle wound so that the fiber is disposed right beside the adjacent fiber 70, and the overlap of the fibers 70 is different from a conventional helical layer (an uneven helical layer). In this manner, the innermost helical layer (an inner layer in which a so-called in-plane stress is high) 70H is preferentially formed as the smooth helical layer (the innermost smooth helical layer). Additionally, when the fibers 70 are hoop-wound around the outside of the innermost smooth helical layer 70H to form the hoop layer 70P, structural bends (undulations), waving or swell of the fibers 70 in the hoop layer 70P can be decreased. That is, the surface (the surface layer) of the smooth helical layer 70H becomes a smooth surface (see FIG. 4), and hence in the hoop layer 70P formed on the smooth surface, the structural bends (undulations) of the fibers 70 due to the unevenness decrease. When the structural bends (undulations) of the fibers 70 of the hoop layer 70P are suppressed in this manner, a fatigue strength of the fibers 70 can be enhanced, and it is possible to obtain advantages that the hoop layer 70P becomes thin and has a high Vf to enhance a burse strength. Moreover, since the innermost helical layer 70H itself is smooth, the burst strength can be enhanced through the thin layer having the high Vf. Vf indicates a fiber volume content ratio. When the value (Vf value) increases, the content ratio of the fibers becomes high, and the content ratio of the resin becomes small. If the value of Vf is excessively high, fatigue durability deteriorates. If the value is excessively lowered, the outer shape of the tank becomes large.

Additionally, the present embodiment has an advantage that the tank strength can noticeably be enhanced. That is, in both the helical layer 70H and the hoop layer 70P, the layer positioned on an inner side (the layer closer to the liner 20) has a larger degree of contribution to the tank strength, and the innermost hoop layer 70P has a large function especially in that the straight part is tightly wound to exert a sufficient pressure resistance. In this respect, according to the present embodiment, when at least the innermost helical layer 70H is formed as a smooth helical layer, the hoop layer 70P adjacent to the outside of the smooth helical layer 70H can smoothly be formed, and the hoop layer 70P can noticeably contribute to the enhancement of the tank strength (see FIG. 4, etc.).

Figure 4:
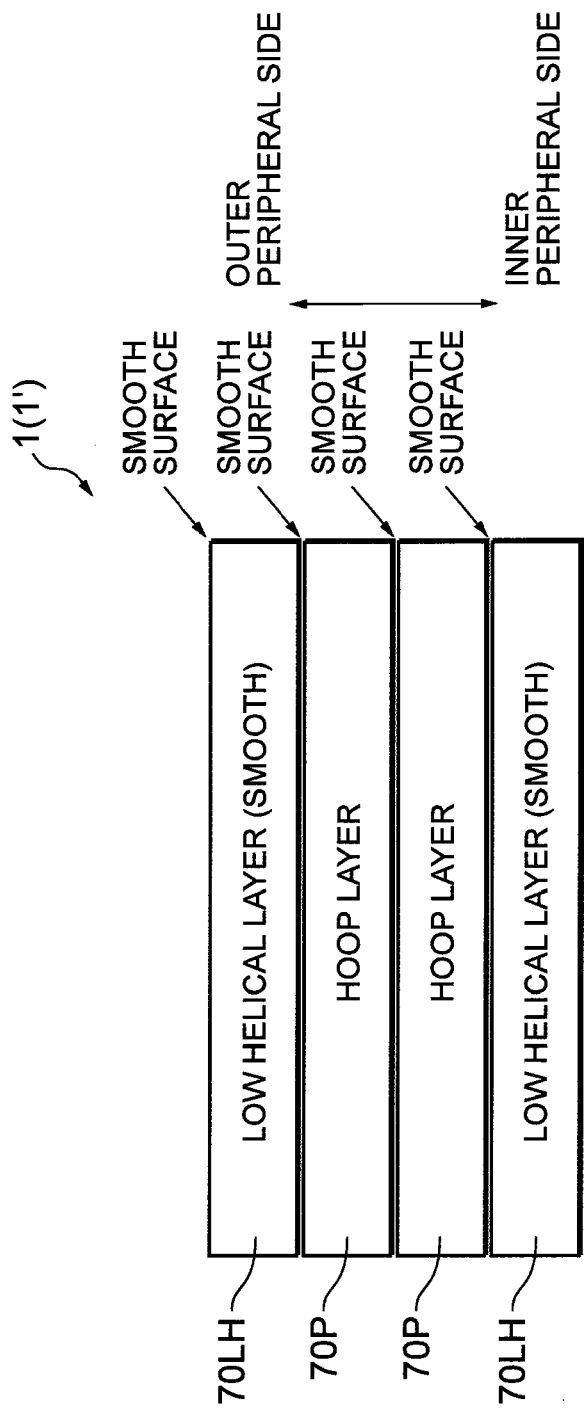
FIG. 4 is a schematic sectional view showing a structure example of an FRP layer of a straight part (or a cylindrical member) of the tank.

Moreover, a layer adjacent to the hoop layer 70P is preferably another hoop layer 70P or the smooth helical layer 70H. The surface of the other hoop layer 70P or the smooth helical layer 70H is smoother than the surface of another layer. Therefore, when the hoop layer 70P is formed, the fibers 70 are hoop-wound around the outside of the other hoop layer 70P or the smooth helical layer 70H, whereby the structural bends (undulations) of the fibers 70 in the corresponding hoop layer 70P can be decreased. Therefore, the fatigue strength of the fibers 70 is enhanced. In addition, the hoop layer 70P has a small thickness and a high fiber volume content ratio (Vf), and the burst strength can be enhanced. As an example, FIG. 4 shows a section in which a first low helical layer (smooth) 70LH, a first hoop layer 70P, a second hoop layer 70P and a second low helical layer (smooth) 70LH are formed in order from the inner layer side. In this case, all the surfaces of the four layers can be formed as smooth surfaces (see FIG. 4).

Figure 5:
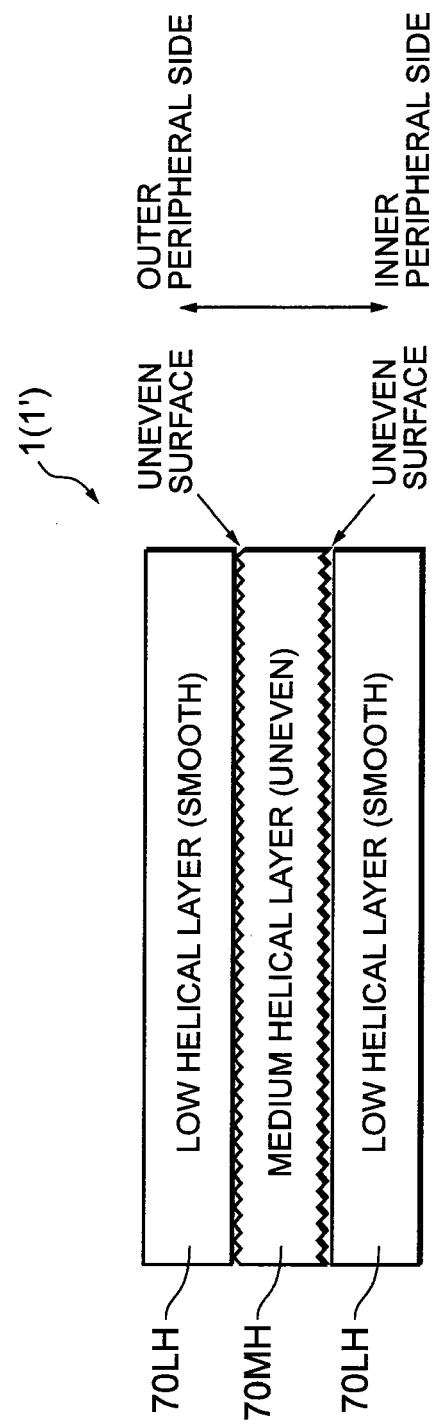
FIG. 5 is a schematic sectional view showing another structure example of the FRP layer of the straight part (or the cylindrical member) of the tank.

Furthermore, the layer adjacent to an uneven helical layer (the helical layer which is not subjected to any treatment for smoothening the surface thereof and has the unevenness occurring on the surface) is preferably a smooth helical layer. In this case, the unevenness of the surface of the uneven helical layer can be absorbed by the smooth helical layer, and hence another hoop layer (e.g. the hoop layer formed further outside the smooth helical layer) 70P can be prevented from being influenced by the unevenness. As an example, FIG. 5 shows a section in which a first low helical layer (smooth) 70LH, a medium helical layer (uneven) 70MH and a second low helical layer (smooth) 70LH are formed in order from the inner layer side. As shown, when the medium helical layer (uneven) 70MH is formed outside the first low helical layer (smooth) 70LH, the low helical layer (smooth) 70LH is formed further outside the helical layer. In this case, the unevenness of the surface of the medium helical layer 70MH can be absorbed by the smooth helical layer (in this case, the second low helical layer 70LH and further the first low helical layer 70LH) (see FIG. 5).

Figure 6:
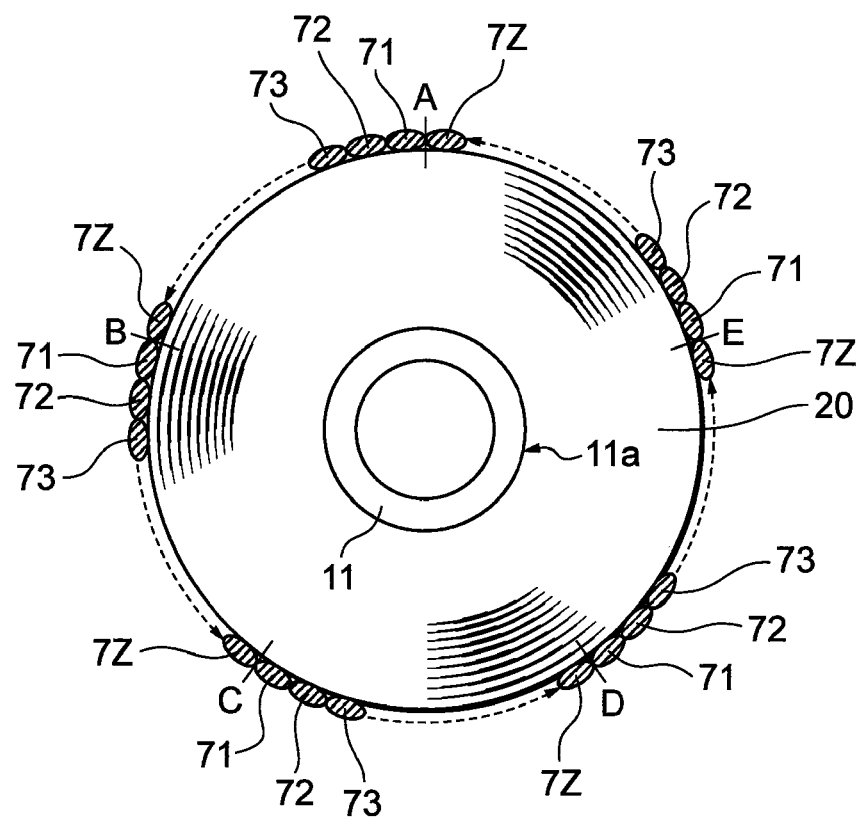
FIG. 6 is a projected diagram of the tank along a tank axial direction for explaining an example of helical winding for forming a smooth helical layer and "a pattern number"
Figure 7:
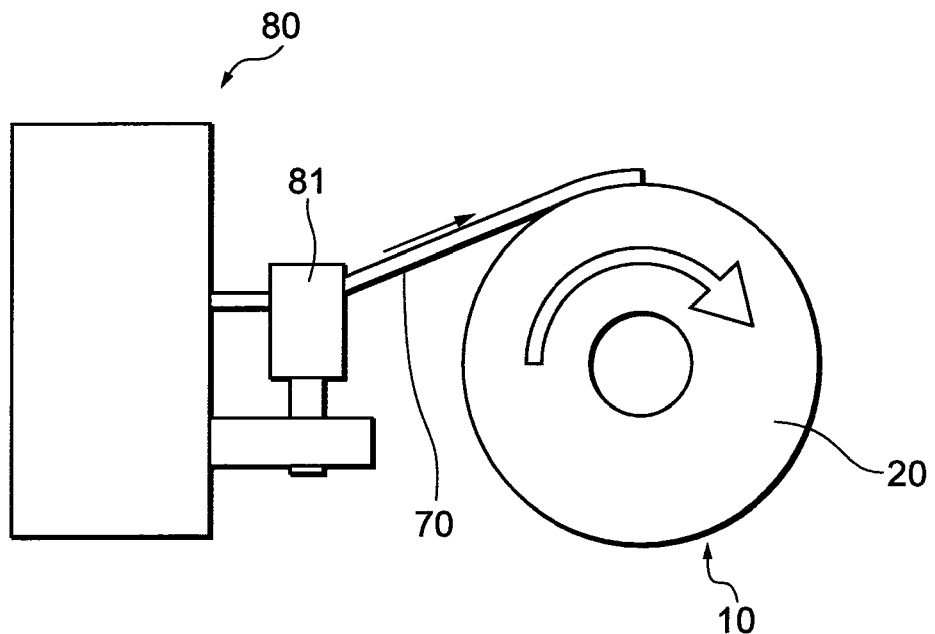
FIG. 7 is a diagram showing an example of a filament winding (FW) device.
Figure 8:
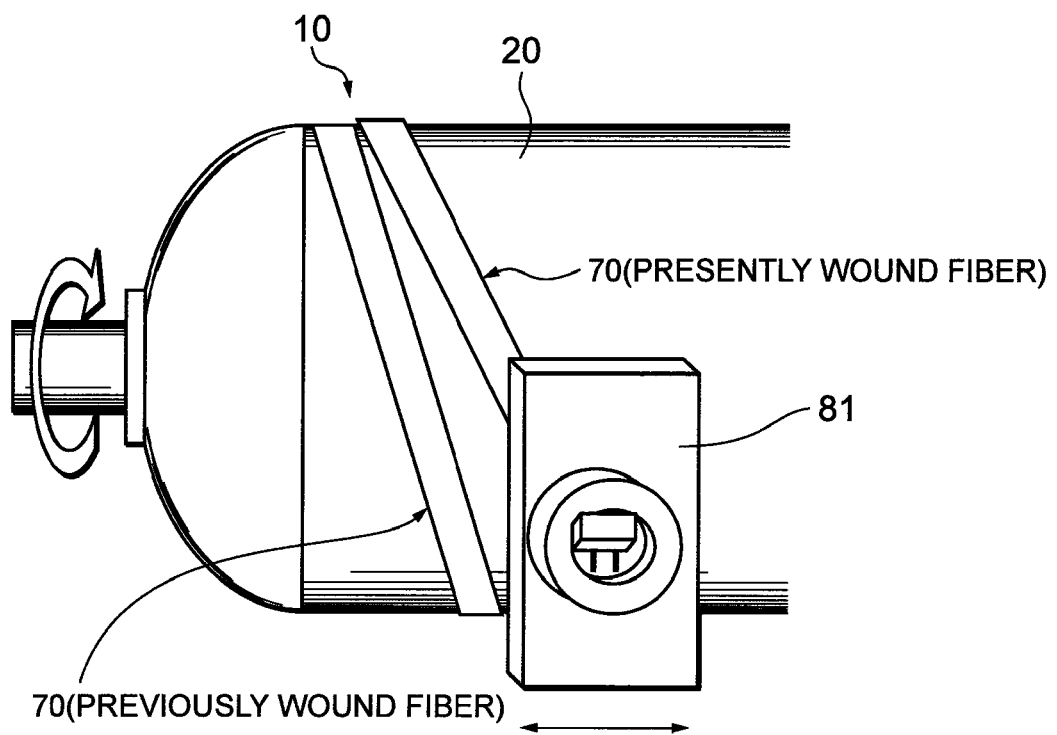
FIG. 8 is a diagram showing a behavior of winding fibers around the outer periphery of a liner by use of a fiber guide unit of the FW device.

Next, there will be described the helical winding for forming the smooth helical layer 70H in which the overlap of the fibers 70 with one another is decreased as much as possible (see FIG. 6, etc.).

Here, an example of a filament winding (FW) device for winding the fibers 70 will briefly be described. In an FW device 80 shown in FIG. 7 and FIG. 8, while rotating the liner 20 around the tank axis, a guide unit (referred to as "a dagger" or the like) 81 of the fibers 70 is reciprocated along the tank axial direction to wind the fibers 70 around the outer periphery of the liner 20. When a relative speed of movement of the guide unit 81 with respect to a rotation number of the liner 20 is changed, a winding angle of the fibers 70 can be changed. The guide unit 81 is supported operably by, for example, a jig.

Figure 11:
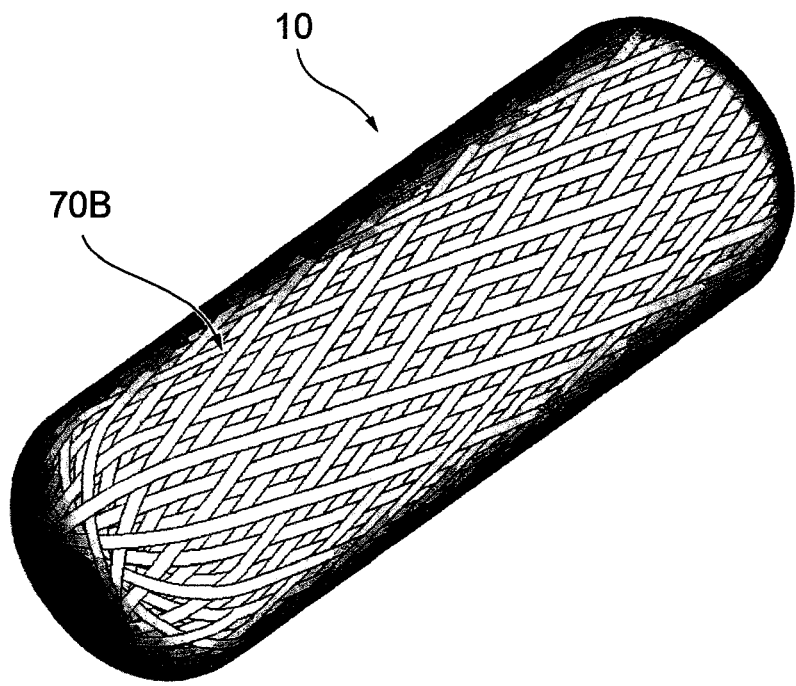
FIG. 11 is a perspective view showing an example of conventional helical winding as a reference.
Figure 12:
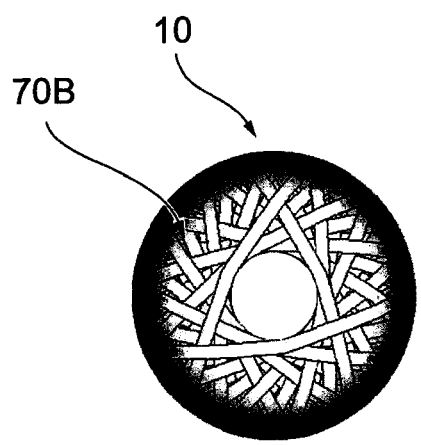
FIG. 12 is a projected diagram along a tank axial direction showing the example of the conventional helical winding as the reference.

Next, there will briefly be described "a pattern number" which becomes a parameter of a winding pattern of the helical winding. The pattern number is represented by, for example, "N/s" of "a division number N" and "a shift number s" of the helical winding. When the pattern number is, for example, "5/2" (a division number of 5 and a shift number of 2), the outer periphery of the tank 1 around the dome part 1*d* is equally divided into reference positions A to E in a peripheral direction (see FIG. 6). When the fiber 70 is wound by the helical winding, the fiber is wound while shifting the fiber so that the fiber passes the reference position which has shifted as much as two positions. In the case of a pattern number of "5/2", one fiber 70 which has passed the reference position A of one dome part 1*d* is wound up to the other dome part 1*d*. When the fiber is returned to the one dome part 1*d* again, the fiber is next wound so that the fiber passes the two-shifted reference position (e.g. the reference position C) (see FIG. 2 and FIG. 6). When this is repeated and every time the fiber 70 is wound to return to the one dome part 1*d*, the fiber successively passes the reference positions A→C→E→B→D→A. When the fiber is wound around the outer periphery five times, the fiber returns to the original reference position. Usually in the case of the usually performed helical winding (e.g. the helical winding with a pattern number of "5/2"), the fibers 70 often overlap with one another, and the helical layer having large unevenness is easily formed (see FIG. 11 and FIG. 12).

Here, the present embodiment employs "N/1" as the pattern number of the helical winding, sets N equally divided points arranged in the peripheral direction as the reference positions, winds a resin around the outer periphery of the liner 20 so that the resin successively passes the reference positions, and then successively winds the resin around the position shifted in the peripheral direction so that the resin is disposed adjacent to the previously wound resin, to form the smooth helical layer 70H. In this case, N is preferably any of integers which are from 1 to 5. Hereinafter, this helical winding will be described while illustrating the case of N=5 (a pattern number of "5/1") (see FIG. 6).

In the helical winding having the pattern number of "5/1", the outer periphery of the tank 1 around the dome part 1*d* is equally divided into five virtual reference positions A to E. Every time the fiber 70 is wound by the helical winding, the fiber is wound while shifting the fiber so that the fiber passes the adjacent reference position. First, the fiber 70 which has passed, for example, the reference position A of the one dome part 1*d* is wound up to the other dome part 1*d*. When the fiber is returned to the one dome part 1*d* again, the fiber is allowed to pass the adjacent reference position (e.g. the reference position B). When this is repeated and every time the fiber is wound to return to the one dome part 1*d*, the fiber 70 successively passes the reference positions A→B→C→D→E. When the fiber is wound around the outer periphery five times, the fiber returns to the original reference position A. The five times are regarded as one set. When one set is finished, the winding shifts to the next set.

Here, in the next set, the fiber 70 is continuously wound so that the fiber is disposed adjacent to the previously wound fiber 70. That is, in FIG. 6, the fiber of the first set is denoted with reference numeral 71, and the fiber of the second set is denoted with reference numeral 72. The fiber 72 of the second set is wound so that the fiber is disposed adjacent to the fiber 71 of the first set (see FIG. 6). Similarly, a fiber 73 of the third set is wound so that the fiber is disposed adjacent to the fiber 72 of the second set. When this is repeated, a plurality of fibers are arranged side by side and the fiber of the reference position A reaches the next reference position B (the fiber of the reference position A is disposed to come in contact with the fiber 71 of the first set at the reference position B), the helical winding of the layer ends. It is to be noted that in FIG. 6, the fiber of the last set is denoted with mark 7Z.

Figure 9:
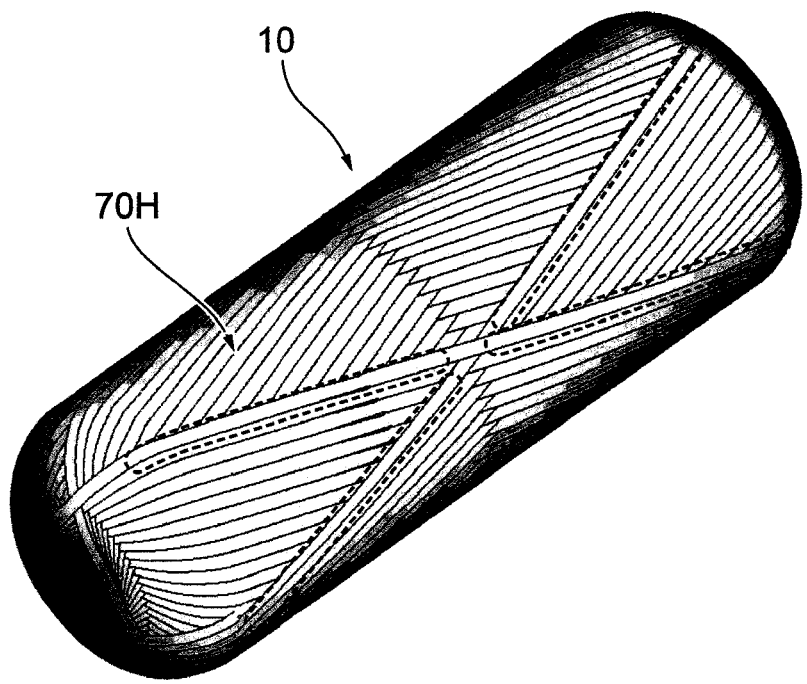
FIG. 9 is a perspective view showing an example of the helical winding in the smooth helical layer.
Figure 10:
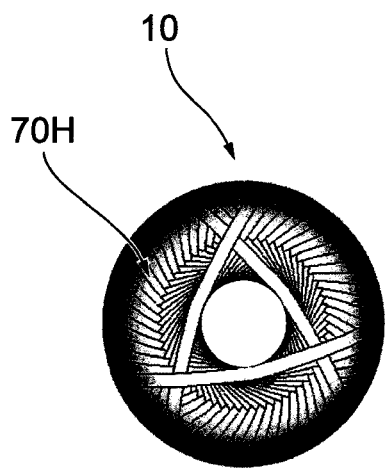
FIG. 10 is a projected diagram along the tank axial direction showing the example of the helical winding in the smooth helical layer.

According to the helical winding described above, the fibers 70 can regularly be wound around the liner 20, and the unevenness due to the overlap of the fibers 70 with one another can be decreased (see FIG. 9 and FIG. 10). In consequence, it is possible to form the smooth helical layer 70H having the smooth surface and less unevenness. Therefore, the unevenness is prevented from being transferred to the hoop layer 70P disposed adjacent to the outside of the smooth helical layer 70H, whereby the structural bends (undulations) of the fibers 70 which might be generated in the hoop layer 70P can be decreased. When the structural bends (undulations) of the fibers 70 of the hoop layer 70P are suppressed in this manner, the fatigue strength of the fibers 70 themselves can be enhanced. Moreover, the hoop layer 70P becomes thin and has a high fiber volume content ratio (Vf), so that the burst strength of the tank 1 enhances. Needless to say, according to the helical winding of the present embodiment, gaps among the fibers 70 in the smooth helical layer 70H itself decrease, and the thickness of each layer becomes small. Furthermore, the helical layer 70H becomes such a smooth helical layer, to obtain the thin layer, and the hoop layer 70P is positioned on the inner side of the tank 1 so that the strength is more easily exerted. In consequence, the hoop layer 70P can become a thin layer. It is to be noted that there has been described a case where the reference positions A to E are arranged counterclockwise (see FIG. 6). Conversely, also when the reference positions are arranged clockwise, similar function and effect can be realized.

The helical winding in the case of the pattern number "5/1" (the division number N=5 and the shift number s=1) has been described above. However, when N is any of 1 to 4, the smooth helical layer 70H can similarly be formed. Moreover, also when N is set to 6 or more, it is possible to form the helical layer 70H in which the unevenness of the surface thereof is decreased. However, when the division number N increases, the winding angle for establishing the smooth helical layer 70H accordingly decreases (becomes a lower angle), and a configuration of the overlap of the fibers 70 with one another also changes. Therefore, it tends to be difficult to smoothen the surface. In this respect, the division number of the pattern number is preferably any of integers which are from 1 to 5 as described above.

It is to be noted that FIG. 9 and FIG. 10 illustrate the helical winding in the case of a pattern number "3/1" (the division number N=3 and the shift number s=1). Since the fibers 70 are regularly wound as described above, unlike conventional helical winding (see FIG. 11 and FIG. 12), a predetermined regular pattern can be recognized in accordance with a winding way as apparent from the diagrams. That is, the fibers 70 arranged side by side form a substantially triangular unit pattern (a twill pattern). Moreover, there is formed a smooth surface having a configuration in which a plurality of unit patterns are regularly combined (see FIG. 9). Moreover, the adjacent unit patterns have different winding directions of the fibers 70, and hence portions which become boundaries among the unit patterns are easily visually recognized (see a part surrounded with a broken line in FIG. 9). As shown in FIG. 9, the portions which become the boundaries exhibit an X-shape. Moreover, these portions which become the boundaries are seen in 6 portions while the fiber is wound around the tank 1 in the peripheral direction once, or in 2N portions in the tank 1 having the division number N (with the proviso that the center of the tank in the axial direction is excluded).

Additionally, according to the helical winding of the present embodiment, a characteristic pattern is also formed in the dome part 1*d* of the tank 1. That is, for example, in the case of the helical winding with the pattern number "3/1", after the helical winding, a visually recognizable substantially regular triangular pattern is formed around the mouthpiece cylindrical portion 11*d* in the dome part 1*d* (see FIG. 10). This pattern changes in accordance with the division number N. If N=4, a substantially regular tetragon pattern is formed. If N=5, a substantially regular pentagon pattern is formed.

As described above, in the tank 1 of the present embodiment in which at least the innermost helical layer 70H is the smooth helical layer, a function and an effect is obtained as follows.

That is, the winding pattern of the helical layer 70H is obtained so that the fibers 70 are superimposed less and the unevenness decreases, so that the structural bends of the fibers 70 in the helical layer 70H can be decreased. Moreover, the gaps among the fibers 70 in the helical layer 70H can be decreased, and hence the thickness of each helical layer can be decreased. Furthermore, the surface of the helical layer becomes smooth, stepped portions become small, and the stepped portions transferred to upper and lower layers (the outer layer and the inner layer) also become small. Therefore, the structural bends of the fibers 70 in the upper and lower layers (e.g. the hoop layers 70P) can be decreased. The decreasing of the structural bends of the fibers 70 in the hoop layer 70P especially contributes to the enhancement of the fatigue strength of the straight part. The decreasing of the structural bends of the fibers 70 in the helical layer 70H especially contributes to the enhancement of the fatigue strength of the dome part. Furthermore, the small thickness and the high Vf in the whole FRP layer especially contribute to the enhancement of the burst strength of the tank 1.

Moreover, a bend stress due to the shape of the dome part is usually exerted on the dome part of the tank 1 (a pressure container), and becomes a decisive factor for so-called interlayer peeling, for example, in the bend breakdown of the CFRP layer 21*c*. In this respect, according to the helical winding of the present embodiment, the gaps among the fibers 70 are decreased, and voids can be decreased in not only the straight part but also the dome part. Therefore, it is possible to expect a suppressing effect of the interlayer peeling by the decreasing of the voids. Moreover, it is possible to expect the enhancement of the burst/cycle strength of the dome part (a burst pressure resistance and a durability against use as much as a plurality of times).

Furthermore, when the voids decrease as described above, an amount of air which becomes a cause for foaming decreases. When the FRP layer 21 thermally hardens, a foaming phenomenon might occur in which air becomes bubbles on the surface layer. However, when the voids can be decreased, the foaming can advantageously be suppressed.

Additionally, when the smooth helical layer 70H is formed, the unevenness of the outermost surface of the tank 1 decreases. In consequence, it is possible to obtain advantages that the outer diameter of the tank 1 is more stabilized and fluctuations of each tank 1 are decreased. In particular, it can be expected that when the helical layer 70H of the outermost layer is formed as the smooth helical layer, the fluctuations of the outer diameter can more effectively be decreased.

Moreover, needless to say, the smooth helical layer 70H itself, and the hoop layer 70P adjacent to this layer have a high Vf, and the resin, accordingly, accumulates less, whereby in the FRP layer 21, an amount of the resin for use decreases. When the amount of the resin decreases in this manner, the weight saving of the tank 1 can be achieved as much as the decrease.

Furthermore, when the FRP layer 21 has a high Vf and the amount of the resin decreases as described above, an amount of hardening heat to be generated (the generation of the heat due to reaction heat during the thermal hardening of the resin) decreases. Usually, when peak temperature during the thermal hardening is high, a problem such as bonding (after the FW forming and the resin hardening, the liner 20 and the FRP layer 21 are partially or entirely bonded) or liner material deterioration might occur. However, these problems can be suppressed in the tank 1 of the present embodiment which can lower the amount of the hardening heat to be generated in this manner.

It is to be noted that the above embodiment is an example of the preferable embodiment of the present invention, but the present invention is not limited to this example, and can various be modified without departing from the scope of the present invention. For example, in the above embodiments, there has been described the case where the innermost helical layer 70H is formed as the smooth helical layer (the innermost smooth helical layer), but in view of various functions and effects in the case where the smooth helical layer 70H is formed, all the helical layers 70H (the low helical layers 70LH) are preferably formed as the smooth helical layers. Moreover, when the medium helical layer 70MH is formed as the smooth helical layer, the above function and effect can be realized also in the medium helical layer 70MH.

Moreover, in the above embodiments, there has been described illustration of a case where the present invention is applied to a hydrogen tank which can be utilized in a fuel cell system or the like, but needless to say, the present invention can be applied to a tank to be filled with a fluid other than a hydrogen gas.

Furthermore, the present invention can be applied to a member other than the tank (the pressure container), for example, a cylindrical member (including a cylindrical portion) such as a long member or structure including the FRP layer. An example will be described. When the FRP layer 21 including the helical layers 70H or the hoop layers 70P is formed by winding the fibers 70 around the outer side of an axle (e.g. a mandrel or the like) or a mold through the helical winding or the hoop winding, the smooth helical layer 70H is formed. In this case, the structural bends of the fibers 70 are decreased, the fatigue strength is enhanced, and the thickness of each layer is decreased. In this manner, a function and an effect can be realized in the same manner as in the above embodiments.

Moreover, when the present invention is applied to a cylindrical member 1' in this manner, in the same manner as in the above embodiments, the layer adjacent to the hoop layer is formed as another hoop layer 70P or the smooth helical layer 70H in one of preferable configurations (see FIG. 4). Alternatively, the layer adjacent to the uneven helical layer 70H is formed as the smooth helical layer in one of preferable configurations (see FIG. 5). It is to be noted that specific examples of the cylindrical member 1' include a sporting equipment such as a shaft of a golf club or a carbon bat, leisure goods such as a fishing rod, an engineering product such as a plant facility and a structure such as a construction material.

INDUSTRIAL APPLICABILITY

The present invention is preferably applied to a tank having an FRP layer, and further to a cylindrical member such as a long member or a structural member.

DESCRIPTION OF REFERENCE NUMERALS

1 . . . tank, 1' . . . cylindrical member, 20 . . . liner, 21 . . . FRP layer, 70 . . . fiber, 70H . . . helical layer, 70P . . . hoop layer, and A, B, C, D and E . . . reference position.

The invention claimed is:

1. A tank comprising:
a liner;
a mouthpiece including an annular recess portion and a collar portion which is formed continuously with the recess portion; and
an FRP layer including a hoop layer and a helical layer formed by winding fibers around an outer periphery of the liner,
wherein at least an innermost helical layer is a smooth helical layer, and
the smooth helical layer is formed by setting a predetermined number of N points equally arranged in a peripheral direction as equally divided reference positions, winding the fibers around the outer periphery of the liner so that the fibers successively pass the reference positions by helical winding, and then successively winding the fibers around positions shifted in the peripheral direction by a predetermined shift number s, wherein the predetermined shift number s is greater than one, so that each fiber is disposed immediately adjacent to a previously wound fiber, with substantially no gap between adjacent fibers.

2. The tank according to claim 1, wherein a layer adjacent to the hoop layer is another hoop layer or the smooth helical layer.

3. The tank according to claim 1, wherein the helical layer adjacent to an uneven helical layer is a smooth helical layer.

4. The tank according to claim 1, wherein a pattern of substantially triangular units is formed on the surface of the smooth helical layer by the wound fibers, and portions which become boundaries among adjacent ones of the substantially triangular units are formed in 2N portions in the peripheral direction of the tank.

5. The tank according to claim 1, wherein a pattern formed in a dome part of the tank by the wound fibers is an N-gon shape (with the proviso that N is 3 or more).

6. The tank according to claim 1, wherein the N is any of integers which are from 1 to 5.

7. A tank comprising:
a liner;
a mouthpiece including an annular recess portion and a collar portion which is formed continuously with the recess portion; and
an FRP layer including a hoop layer and a helical layer formed by winding fibers around an outer periphery of the liner,
wherein at least an innermost helical layer is a smooth helical layer, and
the smooth helical layer is formed by setting a predetermined number of N points, wherein N is 5 or more, equally arranged in a peripheral direction as equally divided reference positions, winding the fibers around the outer periphery of the liner so that the fibers successively pass the reference positions by helical winding, and then successively winding the fibers around positions shifted in the peripheral direction by a predetermined shift number s, wherein the predetermined shift number s is greater than one, so that each fiber is disposed immediately adjacent to a previously wound fiber, with substantially no gap between adjacent fibers.

* * * * *